United States Patent [19]
Crawford et al.

[11] Patent Number: 5,875,012
[45] Date of Patent: Feb. 23, 1999

[54] BROADBAND REFLECTIVE DISPLAY, AND METHODS OF FORMING THE SAME

[75] Inventors: Greg P. Crawford, Providence, R.I.; Thomas G. Fiske, Campbell, Calif.; Louis D. Silverstein, Scottsdale, Ariz.

[73] Assignee: Xerox Corporation, Stamford, Conn.

[21] Appl. No.: 792,269

[22] Filed: Jan. 31, 1997

[51] Int. Cl.$^6$ ................................................ G02F 1/1347
[52] U.S. Cl. .................. 349/74; 349/86; 349/92
[58] Field of Search .............................. 349/74, 78, 86, 349/88, 92

[56] References Cited

U.S. PATENT DOCUMENTS

| | | | |
|---|---|---|---|
| 4,952,033 | 8/1990 | Davis | 349/78 |
| 5,113,272 | 5/1992 | Reamey | 349/78 |
| 5,193,015 | 3/1993 | Shanks | 349/74 |
| 5,463,481 | 10/1995 | Yamamura | 349/74 |
| 5,523,188 | 6/1996 | Choi | 349/74 |
| 5,539,548 | 7/1996 | Yamazaki et al. | 349/74 |
| 5,748,272 | 5/1998 | Tanaka et al. | |
| 5,751,452 | 5/1998 | Tanaka et al. | |

OTHER PUBLICATIONS

K. Tanaka et al., "Optimization of Holographic PDLC for Reflective Color Display Applications," SID 95 Digest, pp. 267–270.

Gregory P. Crawford et al., "Reflective Color Displays for Imaging Applications," Proceedings of the IS&T/SID 1995 Color Imaging Conference: Color Science, Systems and Applications, pp. 52–58.

K. Tanaka., "A Liquid–Crystal/Polymer Optical Device Formed by Holography for Reflective Color Display Applications," PDLC–2, pp. 109–111.

M. Date et al., "Three–Primary–Color Holographic Polymer Dispersed Liquid Crystal (HPDLC) Devices for Reflective Displays," Asia Display '95, pp. 603–606.

M. Kreuzer et al., "New Liquid Crystal Display with Bistability and Selective Erasure Using Scattering i Filled Nematics," *Appl. Phys. Lett.* 62 (15), 12 Apr. 1993, pp. 1712–1714.

Gregory P. Crawford and Slobodan Zumer, eds., *Liquid Crystals in Complex Geometrics,* 1996: Chapter 5, D.–K. Yang et al., "Polymer–Stabilized Cholesteric Textures," pp. 103–142; Chapter 11, J. L. West, The Challenge of New Applications to Liquid Crystal Displays, pp. 255–264; Chapter 12, H. Yuan, Bistable Reflective Cholesteric Displays, pp. 265–280; and Chapter 15, M. Kreuzer et al., Filled Nematics, pp. 307–324.

*Primary Examiner*—William L. Sikes
*Assistant Examiner*—James A. Dudek
*Attorney, Agent, or Firm*—Oliff & Berridge

[57] ABSTRACT

A broadband reflective display has improved reflectivity as well as a lack of haze or opaqueness when viewed from various viewing angles, a reduced drive voltage compared to conventional devices and an improved peak photopic reflectance. The broadband reflective display includes a plurality of pairs of substrates, a plurality of groups of alternating liquid crystal and polymer layers formed between each of the pairs of substrates, each of the groups of liquid crystal and polymer layers being reflective of different wavelengths of light.

22 Claims, 8 Drawing Sheets

BROADBAND REFLECTIVE DISPLAY, AND METHODS OF FORMING THE SAME

BACKGROUND OF THE INVENTION

1. Field of the Invention

This invention relates to a broadband reflective display and methods of forming the same. In particular, the invention relates to a broadband reflective display including a plurality of layers reflective of different wavelengths of light and methods of forming the same.

2. Description of Related Art

Several types of reflective liquid crystal displays have recently been developed. Many of these reflective liquid crystal displays utilize liquid crystal-polymer dispersion technologies. Such displays are superior to conventional polarizer based displays for reflective mode operation.

An example of one type of such a reflective liquid crystal display is the polymer-dispersed liquid crystal (PDLC) display, which operates on the principle of electrically controlled light scattering. With this technology, liquid crystal droplets are embedded in a polymer matrix. In the off-state, the alignment of the liquid crystal droplets (symmetry axis) is random, resulting in an opaque, scattering film because of the mismatch between the effective refractive index of the liquid crystal with that of the polymer. Upon application of an electric field, the liquid crystal within the liquid crystal droplets aligns parallel to the electric field and the composite material becomes transparent. However, contrast ratios in the direct-view reflective mode are in the 5–10:1 range which are strongly cell thickness dependent. Further, the reflectivity of the polymer dispersed liquid crystal reflective display is only about 12 to 15%.

Another type of reflective liquid crystal display is the polymer dispersed cholesteric liquid crystal display (PDCLC), which operates on the principle of Bragg reflection. Such cholesteric liquid crystal displays have a contrast ratio approaching approximately 10:1 with a photopic reflectivity of 10–13% under ambient lighting conditions and peak reflectivity of approximately 40% at the Bragg wavelength.

Another type of reflective liquid crystal display is a polymer stabilized cholesteric texture (PSCT) reflective display. The polymer stabilized cholesteric texture reflective display uses a small amount of polymer additive in the cholesteric liquid crystal medium which assembles into a stabilizing network. Contrast ratios have been reported between 20–30:1 with 10 to 15% photopic reflection under ambient lighting conditions, and nearly 40% peak reflectivity at the Bragg wavelength. Similar displays have been demonstrated without the polymer with comparable performance.

A more recent type of reflective liquid crystal display is the holographic polymer dispersed liquid crystal display. Such a display is reported in "Holographically formed liquid crystal/polymer device for reflective color displays", by Tanaka et al., as reported in the Journal of the Society for Information Display, Volume 2, No. 1, 1994, pages 37–40. Further developments by Tanaka et al. reported on optimization of such a holographic liquid crystal display in "Optimization of Holographic PDLC for Reflective Color Display Applications" in the SID '95 Digest, pages 267–270. This holographically formed polymer dispersed liquid crystal is fabricated using optical interference techniques to form planes of liquid crystal droplets at predesignated positions within the sample setting up a modulation in the liquid crystal droplet densities. The resulting optical interference reflects the Bragg wavelength in the offstate when the liquid crystal material directors encapsulated within the droplets are misaligned. Upon application of an applied voltage, the periodic refractive index modulation vanishes if the refractive index of the liquid crystal is approximately matched with the refractive index of the polymer, and all incident light is transmitted. The spectral reflectance of the display is determined during the fabrication process and can be chosen to reflect any visible wavelength. The above-described holographic liquid crystal/polymer reflective color display is formed with an isotropic polymer which results in liquid crystal droplets being formed during the phase separation. Because the polymer is isotropic, the molecules of the polymer are randomly aligned and the display device has visible opaqueness or haze when viewed from an angle due to the mismatch between the effective refractive index of the liquid crystal and that of the polymer that becomes enhanced at wide viewing angles. Additionally, this display device requires a relatively large drive voltage due to the liquid crystal spherical droplets. In particular, the voltage necessary to drive the display device is proportional to the surface-to-volume ratio of the liquid crystal droplets. Such spherical droplets have a surface-to-volume ratio of 3/R where R is the radius of the droplet.

Figure 4:
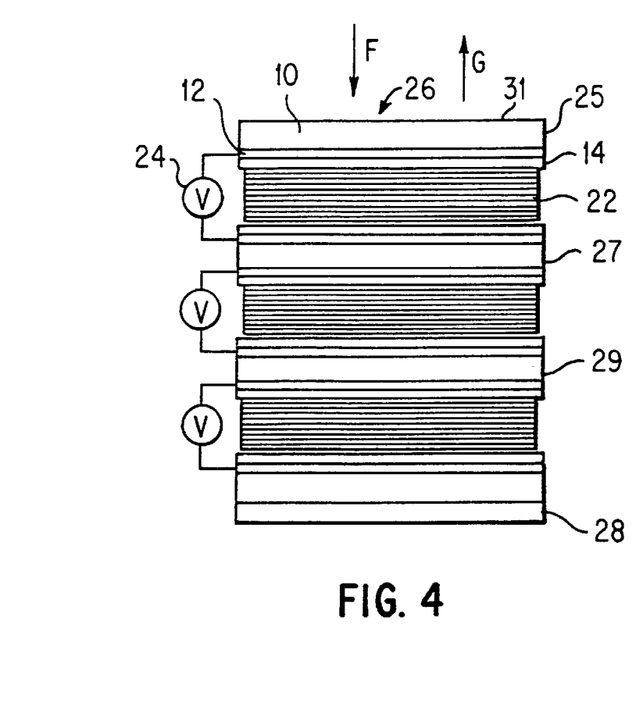
FIG. 4 illustrates a full-color reflective liquid crystal display.

U.S. patent application attorney docket No. JAO 34133, entitled "HOLOGRAPHICALLY FORMED REFLECTIVE DISPLAY, LIQUID CRYSTAL DISPLAY AND PROJECTION SYSTEM AND METHODS OF FORMING THE SAME", the subject matter of which is incorporated herein in it's entirety, discloses holographically formed reflective displays and projection systems. As illustrated in FIG. 4, the full color liquid crystal display includes three holographically formed reflective displays, each being reflective of a different wavelength of light, which may be reflective of red, green and blue light, for example. These displays may typically have a 20 nm bandwidth for each color.

There is a need to provide a reflective display device that can operate at reduced drive voltages, has an improved reflectivity at relatively wide bandwidths, and a haze free appearance when viewed from different viewing angles.

SUMMARY OF THE INVENTION

To solve these and other problems, in a first embodiment, this invention provides a broadband reflective display that has improved reflectivity as well as a lack of haze or opaqueness when viewed from various viewing angles, a reduced drive voltage compared to conventional devices and an improved photopic reflectance. The broadband reflective display of the invention includes a plurality of pairs of substrates, a plurality of groups of alternating liquid crystal and polymer layers formed between each of the pairs of substrates, each of the groups of liquid crystal and polymer layers being reflective of different wavelengths of light.

A more complete understanding of the invention can be obtained by considering the following detailed description, in conjunction with the accompanying drawings, wherein like index numerals indicate like parts.

DETAILED DESCRIPTION OF PREFERRED EMBODIMENTS

Figure 1A:
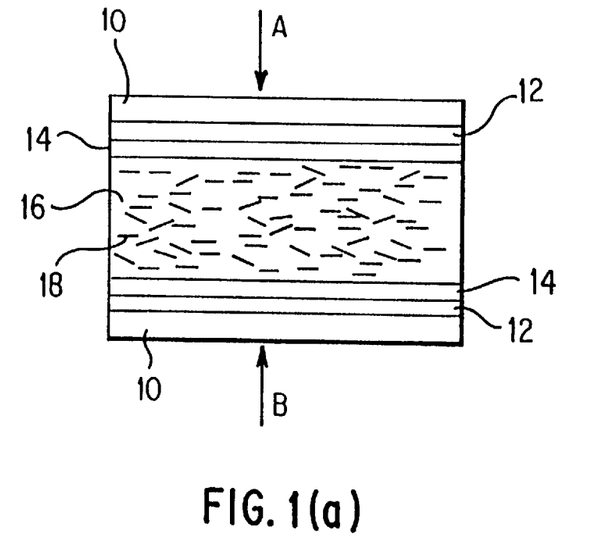
FIG. 1a is a schematic view illustrating the reflective display prior to application of interfering lasers during assembly of the display.

FIG. 1a illustrates a holographically formed reflective display during manufacture. Between substrates 10 are formed indium tin oxide layers 12 and alignment layers 14. Alignment layers 14 may be a rubbed polymer layer, where homogeneous surface boundary conditions are desired, or a silane surfactant layer, for example, where homeotropic (perpendicular) surface boundary conditions are desired, as will be further explained below. Displaced between the alignment layers 14 is a anisotropic polymer 18 dissolved in a liquid crystal solvent. The anisotropic polymer 18 may include a photo-active monomer and suitable photo-initiator. The liquid crystal polymer mixture 16 is homogenized via mechanical agitation and heat.

Figure 1B:
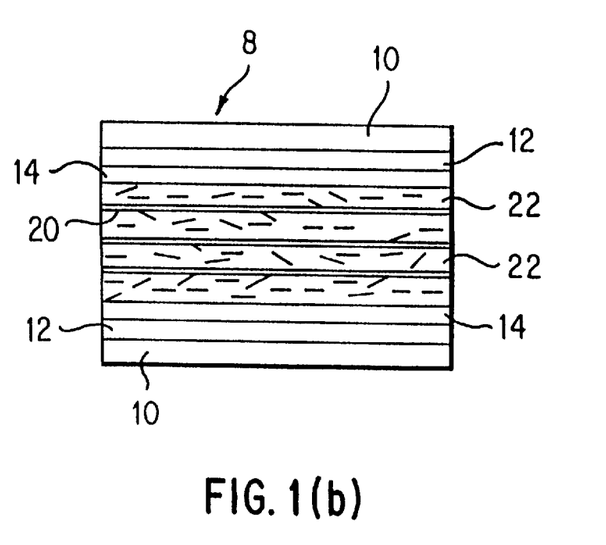
FIG. 1b is a schematic view illustrating the reflective display of the invention.

The device is then irradiated with interfering laser beams A and B, for example, that set up interference fringes within the device. The resultant structure is illustrated in FIG. 1b. Regions within the liquid crystal/polymer mixture 16 that experience the high intensity of the interference pattern of the lasers become polymer rich and form polymer sheets 20 and those regions where the intensity is low become void of polymer and form liquid crystal regions 22. As can be seen in FIG. 1b, the polymer sheets 20 and liquid crystal regions 22 form into a multilayer structure.

Figure 2A:
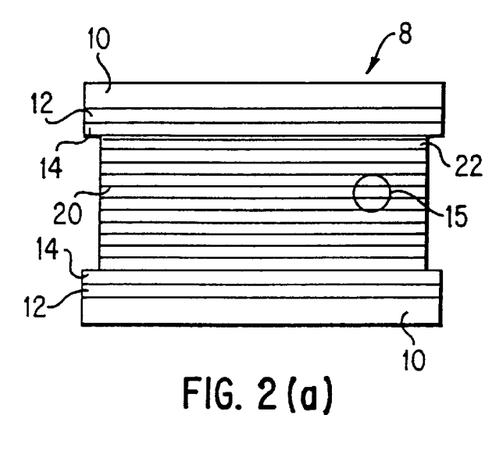
FIGS. 2a–2c illustrate the homogenous and homeotropic surface boundary conditions of the reflective display of the invention in the off-state.

The holographically formed reflective display 8 is illustrated in FIG. 2a in an off-state. The off-state occurs when no electric field is applied between the indium tin oxide layers 12. In the off-state, the display is transparent and all light is transmitted through the display because the molecules of the liquid crystal regions 22 are effectively index matched and aligned with the molecules forming the polymer sheets 20.

Figure 2B:
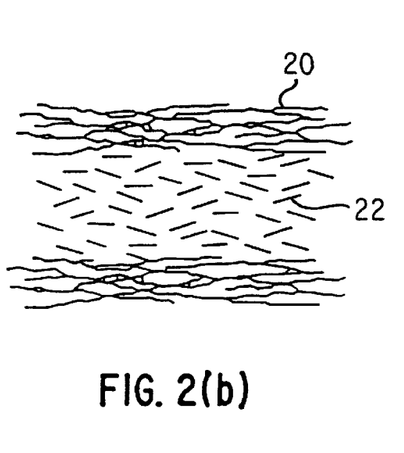
Figure 2C:
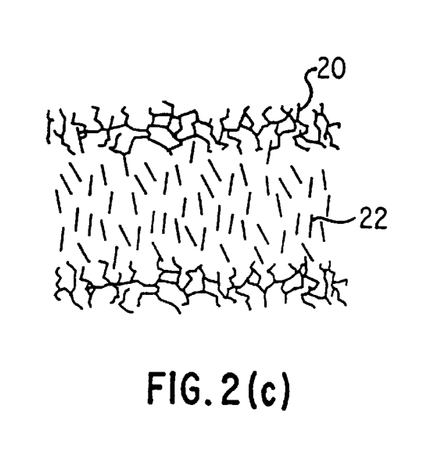
Figure 3A:
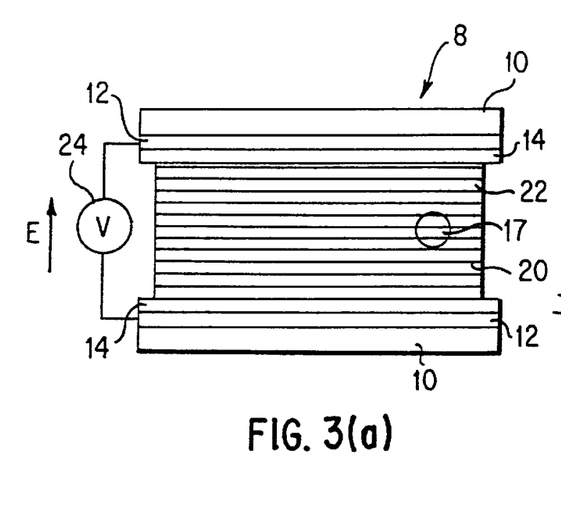
FIGS. 3a–3c illustrate the homogenous and homeotropic surface boundary conditions of the reflective display of the invention in the on-state.

The index matching in the off-state for homogeneous and homeotropic surface boundary conditions is illustrated in FIGS. 2b and 2c, which are enlarged views of the liquid crystal layer 22 and polymer sheets 20 within circles 15 and 17 of FIGS. 2a and 3a, respectively. In particular, FIG. 2b illustrates the homogeneous surface boundary conditions that are formed when the alignment layer 14 is a rubbed polymer layer. Such a rubbed polymer layer is well known to those of ordinary skill in the art and is formed by conventional rubbing techniques. The rubbed polymer layer causes the molecules within the polymer sheets 20 and within the liquid crystal regions 22 to form along the planar alignment direction of the nematic liquid crystal medium in a direction generally parallel to a surface of the substrate 10. As may be seen with reference to FIG. 2b, because the polymer molecules forming the polymer sheets 20 are anisotropic polymer molecules, the molecules are elongated and align in a single direction. Likewise, the molecules forming liquid crystal regions 22 are anisotropic and hence align in the same direction as the molecules forming the polymer sheets. This index matched alignment vastly reduces haze in the holographically formed reflective display 8 when it is viewed from various viewing angles. Conventional holographically formed reflective displays, in contrast, use isotropic polymers which are randomly aligned and thus create haze and opaqueness when viewed from various viewing angles.

Homeotropic surface boundary conditions for the reflective display 8 are illustrated in FIG. 2c, which is an enlarged view of the circle 15 shown in FIG. 2a. The homeotropic surface boundary conditions are created when the alignment layer 14 includes perpendicular alignment. One example is a silane surfactant layer. This causes the anisotropic polymer within the polymer sheets 20 to align substantially perpendicular to a surface of the substrates 10 as illustrated in FIG. 2C. Likewise, because the molecules within the liquid crystal region 22 are anisotropic, they align in the same direction as the anisotropic polymer molecules forming the polymer sheets 20. Again, use of the anisotropic polymer greatly reduces haze and opaqueness in the holographically formed reflective display 8 when viewed from various viewing angles.

FIG. 3a illustrates the holographically formed reflective display 8 in an on-state. In the on-state, a voltage from a voltage source 24 is applied between the indium tin oxide layers 12. This creates an electric field in the direction illustrated by arrow E and causes the display to be reflective of light of a desired wavelength. The desired wavelength of the reflected light may be selected during formation of the device by appropriately controlling the wavelengths of the interference fringes created by the laser or other holograhic means used during device formation.

Figure 3B:
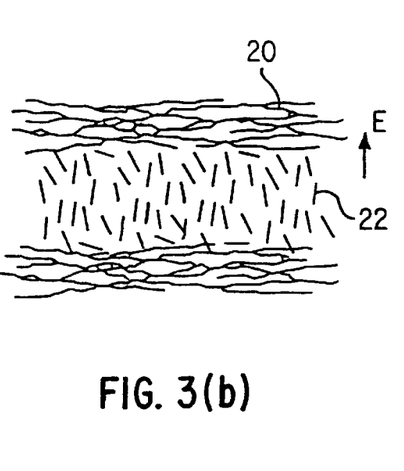

FIG. 3b is an enlarged view of the area shown within circle 17 in FIG. 3a for homogenous surface boundary conditions. Application of the electric field E between the indium tin oxide layers causes molecules with positive dielective anisotropy within the liquid crystal regions 22 to align parallel to the E direction, as illustrated in FIG. 3b. This causes light of a desired wavelength to be reflected while all other light is transmitted.

Figure 3C:
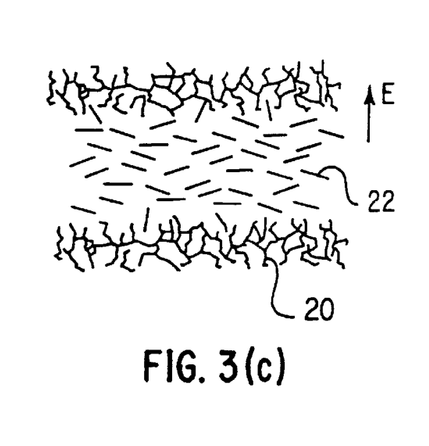

Homeotropic surface boundary conditions for the holographically formed reflective display 8 in the on-state are illustrated in FIG. 3c. For the case of homeotropic alignment, the liquid crystal material used is one with negative dielectric anisotropy. Here, application of the electric field E causes the molecules with negative dielectric anisotropy within the liquid crystal region 22 to align perpendicular to the E field direction causing light of the desired wavelength to be reflected.

A full-color liquid crystal display incorporating three holographically formed reflective displays (as illustrated in FIGS. 1–3c) is illustrated in FIG. 4. For the case of homogeneous surface alignment, the liquid crystal material used is one with positive dielectic anisotropy. The full-color liquid crystal display 26 includes three holographically formed reflective displays 25, 27 and 29 (which are similar to the holographically formed reflective display 8) each being reflective of a different wavelength of light. The full-color liquid crystal display 26 includes black absorber 28 which is used to absorb non-reflected wavelengths and enhance display contrast. As illustrated in FIG. 4, ambient light is exposed to the upper surface 31 of the full-color liquid crystal display 26 in the direction of arrow F. To form an image, the voltage sources 24 are each independently controlled to selectively reflect light from each of the holographically formed reflective displays 8, each reflecting light of a different wavelength. For example, the upper reflective display 25 in FIG. 4 may reflect light of 465 nm, the middle holographically formed reflective display 27 may reflect light of 545 nm and the lower holographically formed reflective display 29 may reflect light of 620 nm, to reflect light of blue, green and red wavelengths, respectively. By selectively activating the three holographic reflective display layers, a full-color image may be formed from incident broad-band illumination.

Figure 5:
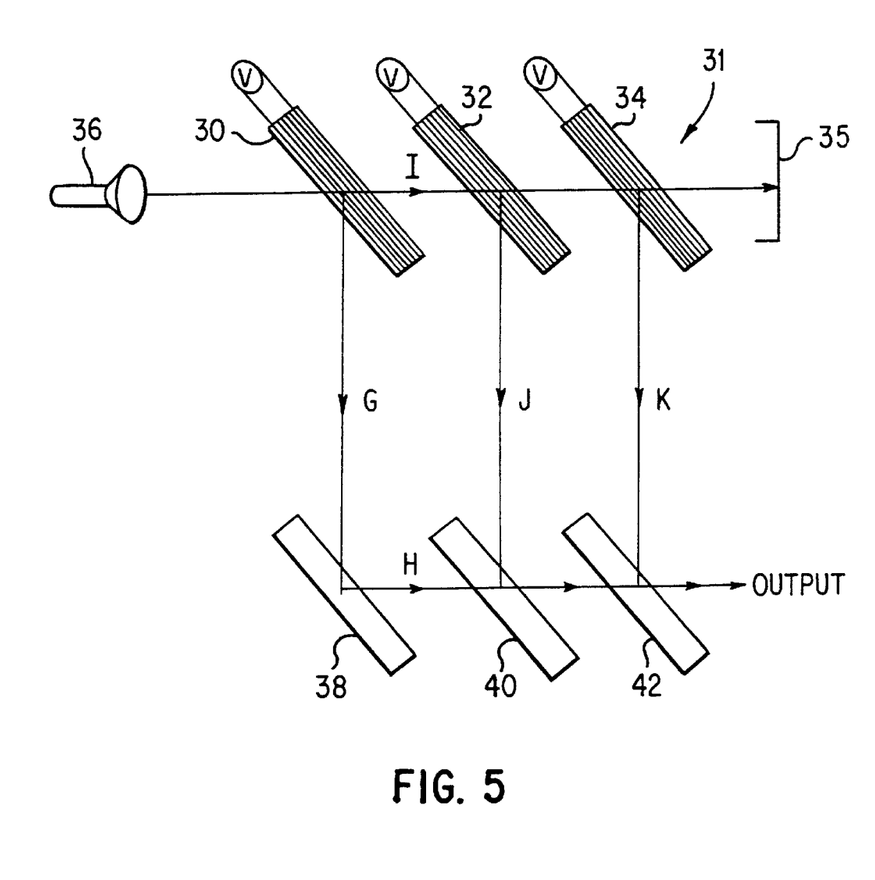
FIG. 5 illustrates a projection system which includes three reflective displays.

FIG. 5 illustrates a full-color projection system 31 which includes a first holographically formed reflective display 30, which may selectively reflect red light having an approximate wavelength of 620 nm, a second holographically formed reflective display 32, which may reflect green light of approximately 545 nm and a third holographically formed reflective display 34, which may reflect blue light of approximately 465 nm.

Light is input from a light source 36 and upon contacting the first holographically formed reflective display 30, red light having a wavelength of approximately 620 nm is reflected in the direction of arrow G onto mirror 38 and reflected towards an output in a direction of arrow H. Light which is not of the red wavelength of approximately 620 nm is transmitted by the first holographically formed reflective display 30 in the direction of arrow I to the second holographically formed reflective display 32. The second holographically formed reflective display 32 reflects light with a green wavelength of approximately 545 nm in the direction of arrow J onto a surface of first dichroic mirror 40. First dichroic wavelength mirror 40 transmits the red light reflected by mirror 38 and reflects the green light in a direction of arrow H. Light from the light source 36 which is not reflected by the second holographically formed reflective display 32 is transmitted to the third holographically formed reflective display 34, which reflects light of a blue wavelength of approximately 465 nm in the direction of arrow K onto a surface of second dichroic mirror 42.

Light which is not reflected by third holographically formed reflective display 34 is transmitted to light stop 35. Second dichroic mirror 42 reflects the blue wavelength light in the direction of arrow H and transmits the red and green light from mirror 38 and first dichroic mirror 40 to the output. In this way, an image may be formed and projected by the full-color projection system 31.

The above-noted reflective wavelengths for the first, second and third holographically formed reflective displays 30, 32 and 34 of the projection system 31 may be varied to the desired value by adjusting the wavelength of light that is reflected by each display to a desired value, as discussed above regarding the FIG. 2a–3c embodiment.

The above-described holographically formed reflective displays may achieve bistable switching by using a chiral nematic or ferroelectric liquid crystal material instead of a typical nematic liquid crystal material which would normally be used. Bistability is more fully discussed in a related application entitled "Bistable Reflective Display Using Chiral Liquid Crystal and Reconfigurable Inorganic Agglomerates" (Attorney Docket No. JAO 34136), the subject matter of which is incorporated herein by reference in its entirety.

Figure 6:
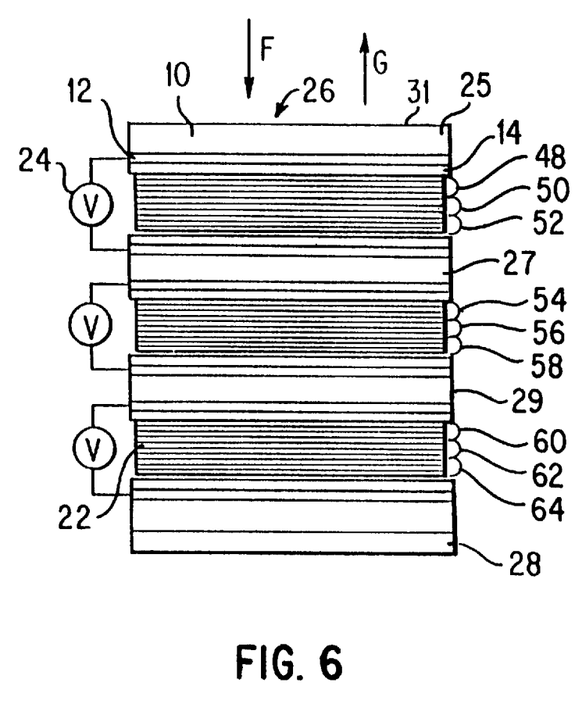
FIG. 6 illustrates a broadband reflective display.

FIG. 6 illustrates a broadband reflective display 47 of the invention. The broadband reflective display 47 is identical to the reflective display 26 of FIG. 4 except that it also includes a plurality of groups of alternating liquid crystal and polymer layers 48–64. Each of the groups of alternating liquid crystal and polymer layers 48–64 may include one liquid crystal layer and one polymer layer or a plurality of liquid crystal layers and a plurality of polymer layers. Each of the groups of alternating liquid crystal and polymer layers 48-64 are formed to be reflective of a different wavelength of light. For example, the group of alternating liquid crystal and polymer layers 48 may be reflective of light having a center wavelength of 610 nm, alternating liquid crystal and polymer layers 50 may be reflective of light having a center wavelength of 630 nm, alternating liquid crystal and polymer layers 52 may be reflective of light having a center wavelength of 650 nm. The three groups of alternating liquid crystal and polymer layers 48, 50 and 52 are thus reflective of closely spaced red wavelengths of light each having a bandwidth of, for example, 20 nm.

Likewise, the group of alternating liquid crystal and polymer layers 54 may be reflective of light having a center wavelength of 520 nm, alternating liquid crystal and polymer layers 56 may be reflective of light having a center wavelength of 540 nm, alternating liquid crystal and polymer layers 58 may be reflective of light having a center wavelength of 560 nm. The three groups of alternating liquid crystal and polymer layers 54, 56 and 58 are thus reflective of closely spaced green wavelengths of light each having a bandwidth of, for example, 20 nm.

Likewise, the group of alternating liquid crystal and polymer layers 60 may be reflective of light having a center wavelength of 440 nm, alternating liquid crystal and polymer layers 62 may be reflective of light having a center wavelength of 460 nm, alternating liquid crystal and polymer layers 64 may be reflective of light having a center wavelength of 480 nm. The three groups of alternating liquid crystal and polymer layers 60, 62 and 64 are thus reflective of closely spaced blue wavelengths of light each having a bandwidth of, for example, 20 nm.

The groups of alternating liquid crystal and polymer layers 48–64 will typically be formed one at a time as described above regarding the embodiment of FIG. 3a with each group of layers being cured to be reflective of the appropriate wavelength of light before the next group of layers is formed. Then, the next group of layers of alternating liquid crystal and polymers are formed by, for example, well known lamination processes and the laser or other holographic means is adjusted to the appropriate wavelength. In this manner, each group of layers of alternating liquid crystal and polymers are formed having the appropriate wavelength. Typically, each group of layers of alternating liquid crystal and polymers may comprise 10–20 pairs of layers, although more or less may be used as required.

The number of layers may be adjusted as desired to increase the reflectance, and spectral bandwidth, but with an increased number of layers a higher drive voltage is required. Additionally, the center bandwidth of each group of layers may be adjusted as desired.

Figure 7A:
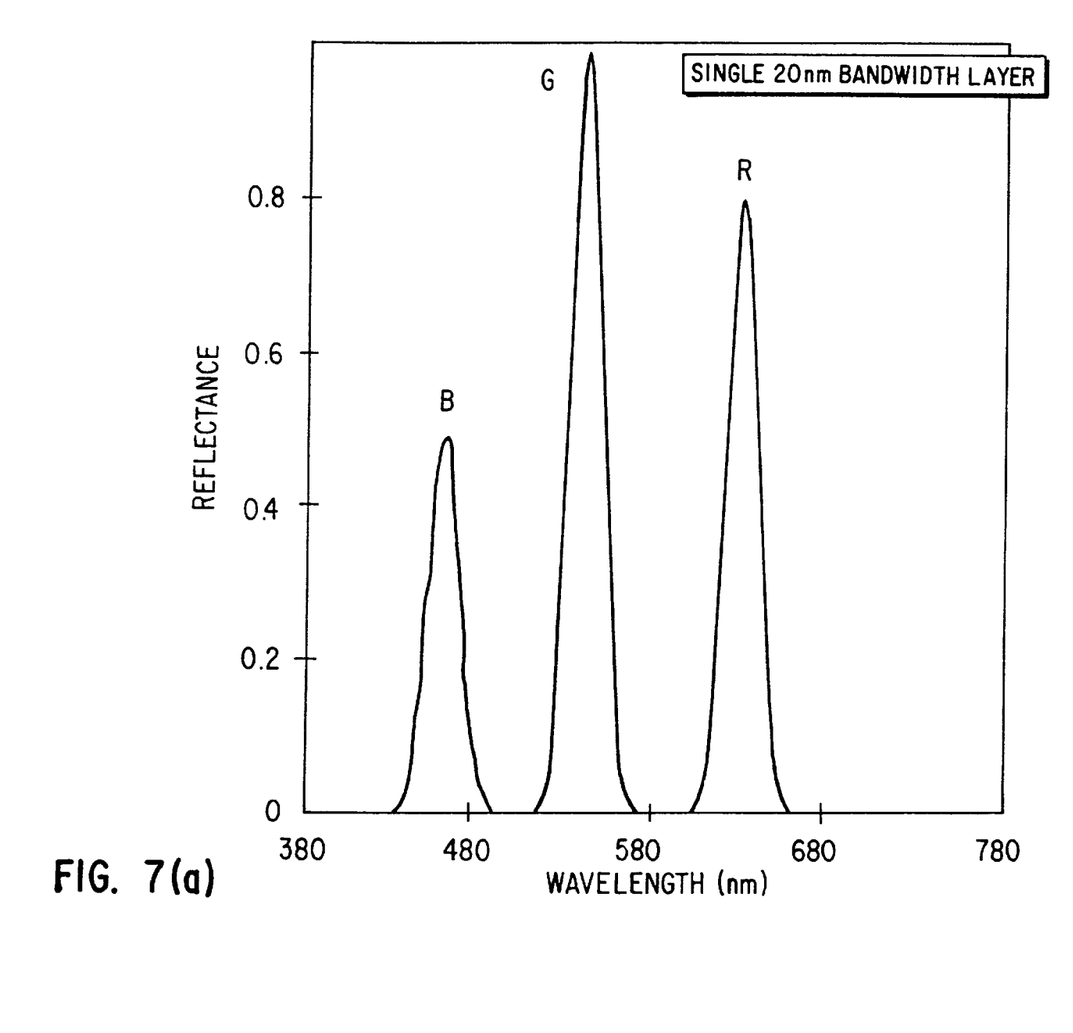
FIG. 7a is a chart illustrating reflectance versus wavelength and FIG. 7b is a chart illustrating chromacity and peak photopic reflectance.
Figure 7B:
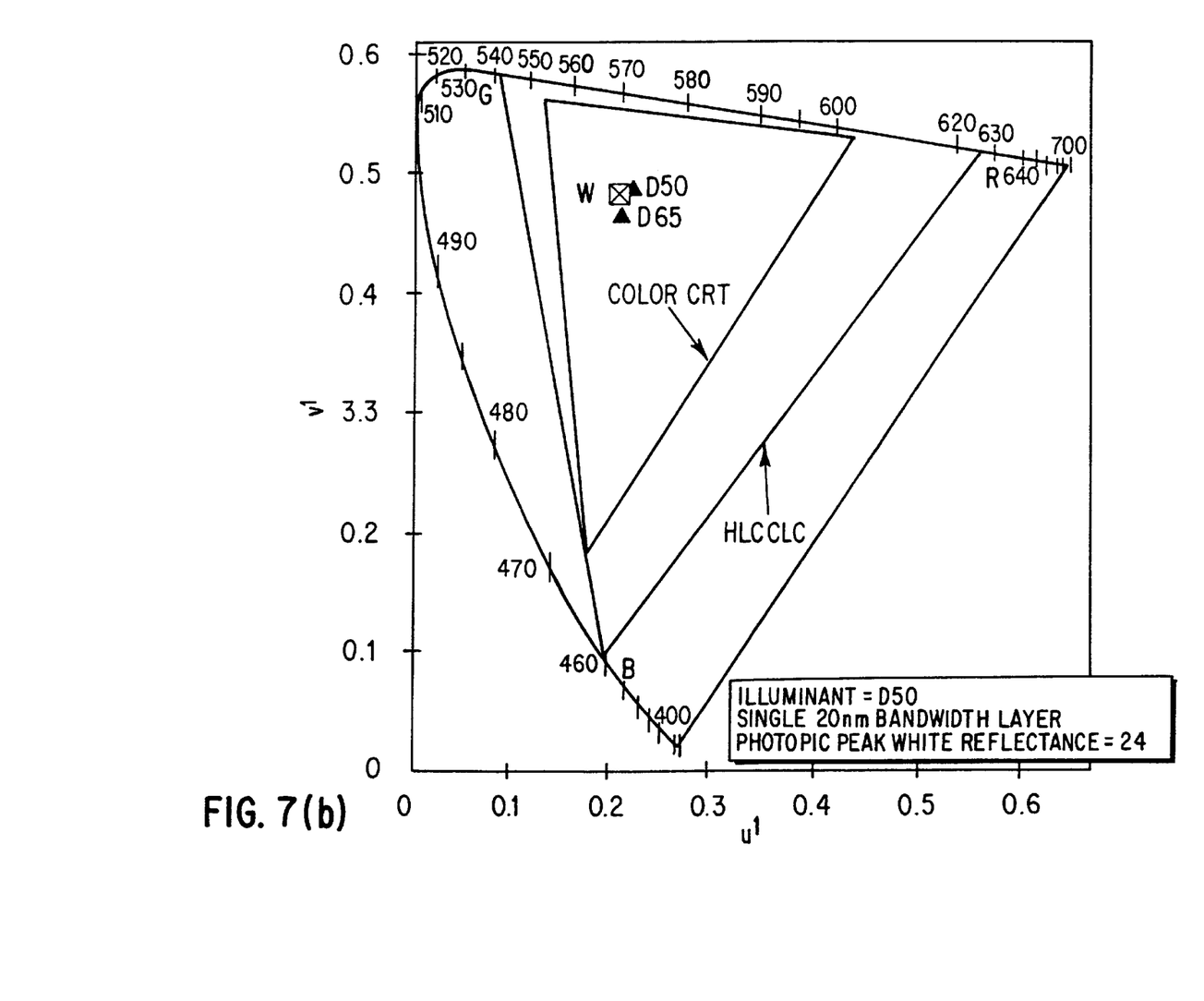

FIG. 7a is a chart illustrating wavelength versus reflectance for a reflective display such as that shown in FIG. 4 with three 20nm bandwidth layers, one centered at each of 460 nm, 540 nm and 630 nm. If 100% reflectance at the green wavelength is achieved, the reflectance levels of the blue and red peaks are adjusted as shown in FIG. 7a to achieve the desired white-point chromaticity. FIG. 7b is a chromaticity diagram that illustrates the resulting chromaticity values of the red, green and blue primaries and white-point for the display shown in FIG. 4. The triangular region labeled "H-PDLC" in FIG. 7b represents the gamut or range of colors the display can render under a broadband illumination of D50. A similar gamut for a typical color CRT display is shown for comparison. The photopic white reflectance for this display is 24k, as noted in FIG. 7b.

Figure 8A:
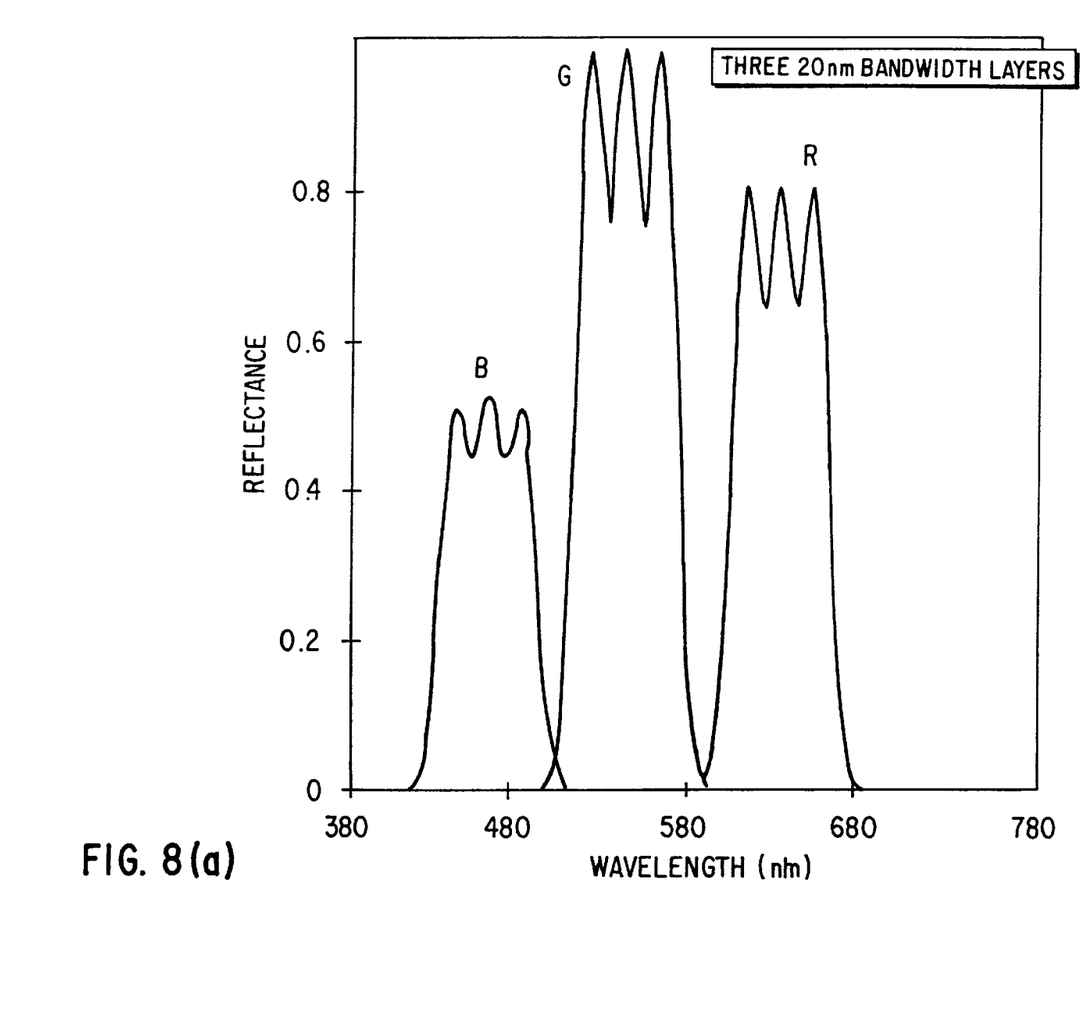
FIG. 8a is a chart illustrating reflectance versus wavelength and FIG. 8b is a chart illustrating chromacity and peak photopic reflectance.
Figure 8B:
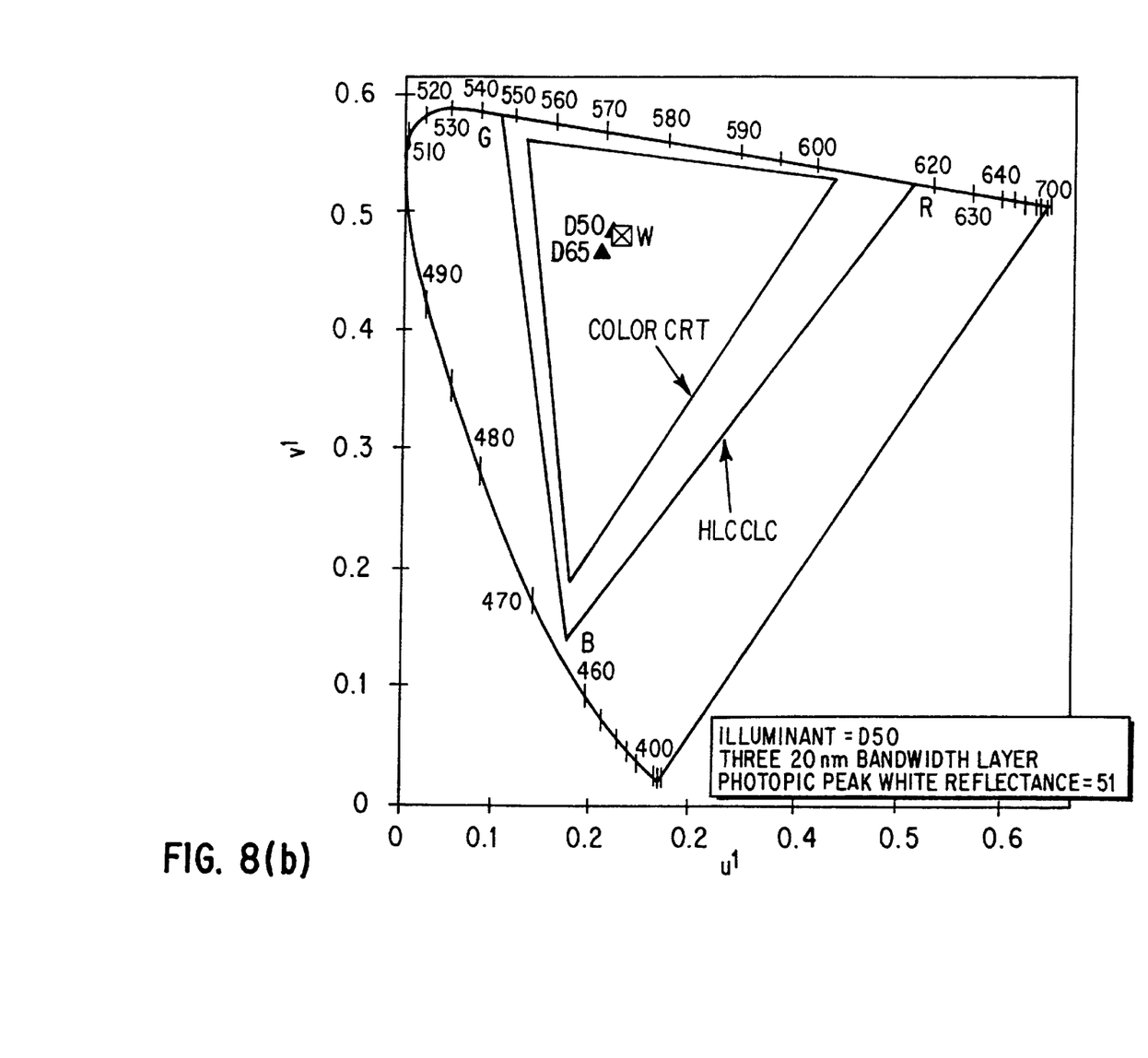

FIG. 8a is a chart illustrating wavelength versus reflectance for a reflective display such as that shown in FIG. 6 with nine 20 nm bandwidth layers, one centered at each of 440 nm, 460 nm, 480 nm, 520 nm, 540 nm, 560 nm, 610 nm, 630 nm and 650 nm. The relative reflectance values of the green, red and blue peaks are adjusted as shown in FIG. 8a to achieve the desired white-point chromaticity. Because this configuration greatly increases the bandwidth of the reflectance peaks compared to the display in FIG. 4, the photopic white reflectance for this display is increased to 61%. The chromaticity diagram, FIG. 8b, illustrates the resulting chromaticity values of the red, green and blue primaries and the white-point for the display shown in FIG. 6. The trianglular region labeled "H-PLDC" represents the gamut or range of colors the display can render under a broadband illumination of D50. A similar gamut for a typical color CRT display is shown for comparison. The increase in photopic white reflectance is achieved at the expense of a slightly reduced color gamut as seen in FIG. 8b.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A broadband reflective display, comprising:
    a plurality of pairs of substrates; and
    a plurality of groups of alternating liquid crystal and polymer layers formed between each of the pairs of substrates, each of the groups of liquid crystal and polymer layers being reflective of different wavelengths of light.

2. The broadband reflective display of claim 1, wherein the liquid crystal is a nematic liquid crystal material.

3. The broadband reflective display of claim 1, wherein the liquid crystal and polymer molecules forming the polymer layers are index matched so as to reduce haze in the display when viewed from various viewing angles.

4. The broadband reflective display of claim 1, wherein the plurality of pairs of substrates comprises first, second and third pairs of substrates.

5. The broadband reflective display of claim 1, wherein the different wavelengths of light are selectively tunable.

6. The broadband reflective display of claim 4, wherein the plurality of alternating groups of liquid crystal and polymer layers comprises first, second and third groups of liquid crystal and polymer layers formed between each of the first, second and third pairs of substrates.

7. The broadband reflective display of claim 6, wherein the first, second and third groups of liquid crystal and polymer layers between the first pair of substrates are reflective of light having wavelengths of approximately 610 nm, 630 nm and 650 nm, respectively, the first, second and third groups of liquid crystal and polymer layers between the second pair of substrates are reflective of light having wavelengths of approximately 520 nm, 540 nm and 560 nm, and the first, second and third groups of liquid crystal and polymer layers between the third pair of substrates are reflective of light having wavelengths of approximately 440 nm, 460 nm and 480 nm, respectively.

8. The broadband reflective display of claim 1, wherein the display operates in a reverse mode in which when no electric field is applied, the broadband reflective display is transparent, and when an electric field is applied, the broadband reflective display is reflective of the different wavelengths of light.

9. The broadband reflective display of claim 1, further comprising a rubbed polymer layer formed between the substrates and the liquid crystal so as to cause homogeneous surface boundary conditions between polymer molecules within the polymer sheets and liquid crystal molecules within the liquid crystal.

10. The broadband reflective display of claim 1, further comprising a material inducing homeotropic surfacing anchoring formed between the substrates and the liquid crystal so as to cause homeotropic surface boundary conditions between polymer molecules within the polymer sheets and liquid crystal molecules within the liquid crystal.

11. The broadband reflective display of claim 1, wherein the liquid crystal is a chiral liquid crystal material.

12. The broadband reflective display of claim 1, wherein the liquid crystal is a ferroelectric liquid crystal material.

13. A method of forming a broadband reflective display, comprising:
    forming a plurality of pairs of substrates;
    forming a plurality of groups of alternating liquid crystal and polymer layers between each of the pairs of substrates, each of the groups of liquid crystal and polymer layers being reflective of different wavelengths of light.

14. The method of forming a broadband reflective display of claim 13, wherein the liquid crystal is an anisotropic liquid crystal material.

15. The method of forming a broadband reflective display of claim 13, further comprising index matching the liquid crystal and the polymer sheets so as to reduce haze in the display when viewed from various viewing angles.

16. The method of forming a broadband reflective display of claim 13, wherein forming a plurality of pairs of substrates comprises forming first, second and third pairs of substrates.

17. The method of forming a broadband reflective display of claim 13, further comprising selectively tuning the different wavelengths of light.

18. The method of forming a broadband reflective display of claim 13, wherein forming the groups of alternating liquid crystal and polymer layers comprises forming first, second and third groups of liquid crystal and polymer layers between each of the first, second and third pairs of substrates.

19. The method of forming a broadband reflective display of claim 18, further comprising forming the first, second and third groups of liquid crystal and polymer layers between the first pair of substrates to be reflective of light having wavelengths of approximately 610 nm, 630 nm and 650 nm, respectively, forming the first, second and third groups of liquid crystal and polymer layers between the second pair of substrates to be reflective of light having wavelengths of approximately 520 nm, 540 nm and 560 nm, and forming the first, second and third groups of liquid crystal and polymer layers between the third pair of substrates to be reflective of light having wavelengths of approximately 440 nm, 460 nm and 480 nm, respectively.

20. The method of forming a broadband reflective display of claim 13, further comprising phase separating the plurality of anisotropic polymer sheets from the liquid crystal material by application of a laser.

21. The method of forming a broadband reflective display of claim 13, further comprising forming a rubbed polymer layer between the substrates and the liquid crystal so as to cause homogeneous surface boundary conditions between polymer molecules within the polymer sheets and liquid crystal molecules within the liquid crystal.

22. The method of forming a broadband reflective display of claim 13, further comprising forming a material inducing homeotropic surface anchoring between the substrates and the liquid crystal so as to cause homeotropic surface boundary conditions between polymer molecules within the polymer sheets and liquid crystal molecules within the liquid crystal.

* * * * *